United States Patent
Sorkin

[19]

[11] Patent Number: 5,954,373
[45] Date of Patent: Sep. 21, 1999

[54] DUCT COUPLER APPARATUS

[76] Inventor: Felix L. Sorkin, 4115B Greenbriar Dr., P.O. Box 1503, Stafford, Tex. 77477

[21] Appl. No.: 09/039,430

[22] Filed: Mar. 16, 1998

[51] Int. Cl.$^6$ .................................................. F16L 37/18
[52] U.S. Cl. ......................... 285/312; 285/320; 285/369; 285/423; 285/903; 285/921
[58] Field of Search ................................ 285/308, 309, 285/310, 311, 312, 320, 322, 319, 369, 423, 903, 921

[56] References Cited

U.S. PATENT DOCUMENTS

| | | | |
|---|---|---|---|
| 3,976,313 | 8/1976 | Lauffenburger et al. | 285/312 X |
| 4,462,654 | 7/1984 | Aiello | 285/320 X |
| 4,519,635 | 5/1985 | McMath | 285/312 X |
| 5,330,235 | 7/1994 | Wagner et al. | 285/320 X |
| 5,395,140 | 3/1995 | Wiethorn | 285/320 X |
| 5,474,335 | 12/1995 | Sorkin | 285/322 |

FOREIGN PATENT DOCUMENTS

| | | | |
|---|---|---|---|
| 643472 | 4/1937 | Germany | 285/312 |
| 3739745 | 11/1988 | Germany | 285/320 |

*Primary Examiner*—Dave W. Arola
*Attorney, Agent, or Firm*—Harrison & Egbert

[57] ABSTRACT

A coupler apparatus for use with ducts is used on a multi-strand post-tensioning system. The coupler includes a tubular body with an interior passageway between a first open end and a second open end. A shoulder is formed within the tubular body between the open ends. A seal is connected to the shoulder so as to form a liquid-tight seal with a duct received within one of the open ends. A compression device is hingedly connected to the tubular body for urging the duct into compressive contact with the seal. The compression device has a portion extending exterior of the tubular body. The compression device includes an arm with an end hingedly connected to the tubular body and having an abutment surface adjacent the end. The arm is movable between a first position extending outwardly of an exterior of the tubular body and a second position aligned with an exterior surface of the tubular body. A latching member is connected to an opposite end of the arm to affixing the arm in the second position. The abutment surface of the arm serves to push a corrugation of the duct against the seal and against the shoulder so as to form a liquid-tight seal between the duct and the interior of the coupler.

12 Claims, 2 Drawing Sheets

DUCT COUPLER APPARATUS

TECHNICAL FIELD

The present invention relates to a duct coupler, and more particularly to a coupler for providing a water-tight joint between adjacent sections of duct used to provide a channel for multi-strand post-tensioning of concrete structures.

BACKGROUND ART

For many years, the design of concrete structures imitated the typical steel design of column, girder and beam. With technological advances in structural concrete, however, its own form began to evolve. Concrete has the advantages of lower cost than steel, of not requiring fireproofing, and of its plasticity, a quality that lends itself to free flowing or boldly massive architectural concepts. On the other hand, structural concrete, though quite capable of carrying almost any compressive load, is weak in carrying significant tensile loads. It becomes necessary, therefore, to add steel bars, called reinforcements, to concrete, thus allowing the concrete to carry the compressive forces and the steel to carry the tensile forces.

Structures of reinforced concrete may be constructed with load-bearing walls, but this method does not use the full potentialities of the concrete. The skeleton frame, in which the floors and roofs rest directly on exterior and interior reinforced-concrete columns, has proven to be most economic and popular. Reinforced-concrete framing is seemingly a quite simple form of construction. First, wood or steel forms are constructed in the sizes, positions, and shapes called for by engineering and design requirements. The steel reinforcing is then placed and held in position by wires at its intersections. Devices known as chairs and spacers are used to keep the reinforcing bars apart and raised off the form work. The size and number of the steel bars depends completely upon the imposed loads and the need to transfer these loads evenly throughout the building and down to the foundation. After the reinforcing is set in place, the concrete, a mixture of water, cement, sand, and stone or aggregate, of proportions calculated to produce the required strength, is placed, care being taken to prevent voids or honeycombs.

One of the simplest designs in concrete frames is the beam-and-slab. This system follows ordinary steel design that uses concrete beams that are cast integrally with the floor slabs. The beam-and-slab system is often used in apartment buildings and other structures where the beams are not visually objectionable and can be hidden. The reinforcement is simple and the forms for casting can be utilized over and over for the same shape. The system, therefore, produces an economically viable structure. With the development of flat-slab construction, exposed beams can be eliminated. In this system, reinforcing bars are projected at right angles and in two directions from every column supporting flat slabs spanning twelve or fifteen feet in both directions.

Reinforced concrete reaches its highest potentialities when it is used in pre-stressed or post-tensioned members. Spans as great as one hundred feet can be attained in members as deep as three feet for roof loads. The basic principle is simple. In pre-stressing, reinforcing rods of high tensile strength wires are stretched to a certain determined limit and then high-strength concrete is placed around them. When the concrete has set, it holds the steel in a tight grip, preventing slippage or sagging. Post-tensioning follows the same principle, but the reinforcing tendon, usually a steel cable, is held loosely in place while the concrete is placed around it. The reinforcing tendon is then stretched by hydraulic jacks and securely anchored into place. Pre-stressing is done with individual members in the shop and post-tensioning as part of the structure on the site.

In a typical tendon tensioning anchor assembly used in such post-tensioning operations, there are provided anchors for anchoring the ends of the cables suspended therebetween. In the course of tensioning the cable in a concrete structure, a hydraulic jack or the like is releasably attached to one of the exposed ends of each cable for applying a predetermined amount of tension to the tendon, which extends through the anchor. When the desired amount of tension is applied to the cable, wedges, threaded nuts, or the like, are used to capture the cable at the anchor plate and, as the jack is removed from the tendon, to prevent its relaxation and hold it in its stressed condition.

Multi-strand tensioning is used when forming especially long post-tensioned concrete structures, or those which must carry especially heavy loads, such as elongated concrete beams for buildings, bridges, highway overpasses, etc. Multiple axially aligned strands of cable are used in order to achieve the required compressive forces for offsetting the anticipated loads. Special multi-strand anchors are utilized, with ports for the desired number of tensioning cables. Individual cables are then strung between the anchors, tensioned and locked as described above for the conventional monofilament post-tensioning system.

As with monofilament installations, it is highly desirable to protect the tensioned steel cables from corrosive elements, such as de-icing chemicals, sea water, brackish water, and even rain water which could enter through cracks or pores in the concrete and eventually cause corrosion and loss of tension of the cables. In multi-strand applications, the cables typically are protected against exposure to corrosive elements by surrounding them with a metal duct or, more recently, with a flexible duct made of an impermeable material, such as plastic. The protective duct extends between the anchors and in surrounding relationship to the bundle of tensioning cables. Flexible duct, which typically is provided in 20 to 40 foot sections is sealed at each end to an anchor and between adjacent sections of duct to provide a water-tight channel. Grout then may be pumped into the interior of the duct in surrounding relationship to the cables to provide further protection.

Several approaches have been tried to solve the problem of quickly, inexpensively and securely sealing the joints between adjacent sections of duct used in multi-strand post-tensioned applications. However, all prior art devices have utilized a plurality of arcuate sections which must be assembled at a joint around the ends of adjacent duct sections. Wedges, compression bolts or the like then are used to compress the joined sections into sealing engagement with the duct and with each other. Such prior art devices have been cumbersome to use and have proved somewhat unreliable in their ability to exclude moisture or other corrosive elements from the interior of the ducts.

Two recent patents have issued relating to duct couplers. For example, U.S. Pat. No. 5,320,319, issued on Jun. 14, 1994, to K. Luthi describes a coupling element which is fitted with chamfered flanges. The sheaths of the coupler have protrusions which are inserted into the coupling element with a tubular element which forms the end of the sheaths. A sealing ring is inserted between each of the flanges and protrusions of the sheaths. The flanges and the protrusions are held together by sloping surfaces and by a groove worked within each socket. Also, U.S. Pat. No.

5,474,335, issued on Dec. 12, 1995, to the present inventor, describes a duct coupler for joining and sealing between adjacent sections of the duct. The coupler includes a body, flexible cantilevered sections on the end of the body adapted to pass over annular protrusions on the duct and locking rings for locking the cantilevered flexible sections into position, so as to lock the coupler onto the duct.

It is an object of the present invention to provide a coupler for sealing between adjacent sections of an elongated duct.

It is another object of the present invention to provide a coupler which facilitates installation by the user and which, when engaged with the opposed duct ends, will securely seal against the intrusion of corrosive elements.

It is a further object of the present invention to provide a coupler which includes a latching mechanism for securely engaging coupler sections together and for conforming the internal seal to the surfaces of the duct.

It is a further object of the present invention to provide a coupler which is of unitary construction.

It is still a further object of the present invention to provide a coupler which is easy to use, easy to manufacture, and relatively inexpensive.

It is still another object of the present invention to provide a duct coupler apparatus which maintains the integrity of an annular seal in the area of the connection between the coupler and the duct.

It is another object of the present invention to provide a duct coupler apparatus which facilitates the compressive contact between the corrugations of the duct and the seal on the interior of the coupler.

These and other objects and advantages of the present invention will become apparent from a reading of the attached specification and appended claims.

SUMMARY OF THE INVENTION

The present invention is a duct coupler apparatus comprising a tubular body with an interior passageway and a first open end and a second open end. The tubular body has an interior shoulder formed within the interior passageway between the first and second open ends. A sealing means is connected to the shoulder so as to form a liquid-tight seal with a duct received within one of the open ends. A compression means is hingedly connected to the tubular body for urging the duct into compressive contact with the sealing means. The compression means includes a portion which extends exterior of the tubular body.

In the present invention, the shoulder has one side facing the first open end and another side facing the second open end of the tubular body. A first annular seal is affixed to the one side of the shoulder and extends around the interior passageway and a second arm which is affixed to the other side of the shoulder and extends around the interior passageway.

The compression means of the present invention includes an arm with an end hingedly connected to the tubular body. The arm has an abutment surface adjacent to this end. A latching means is connected to an opposite end of the arm for fixedly attaching the opposite end of the arm to the tubular body. The body includes a first slot formed therein adjacent to the first open end. The latching means serves to engage this first slot. The body includes a second slot formed therein adjacent to the first open end and on an opposite side of the tubular body. The latching means is engageable with the second slot. The arm is movable between a first position extending outwardly of an exterior of the tubular body and a second position aligned with the exterior surface of the tubular body. The latching means engages the first and second slots when in this second position. The latching means includes, in particular, a generally U-shaped member affixed to the opposite end of the arm, a first prong formed at an end of the U-shaped member, and a second prong formed at an opposite end of the U-shaped member.

In the present invention, the tubular body, the arm and the latching means are integrally formed together of a polymeric material.

In the present invention, more particularly, the compression means includes a first arm which is hingedly connected to one side of the tubular body adjacent the first open end, a second arm hingedly connected to an opposite side of the tubular body adjacent to the first open end, a third arm hingedly connected to one side of the tubular body adjacent the second open end, and a fourth arm hingedly connected to an opposite side of the tubular body adjacent the second open end. Each of the arms is movable between a first position extending outwardly from the tubular body and a second position aligned with an exterior surface of the tubular body. Each of these arms includes an abutment surface formed thereon adjacent to the hinged connection with the tubular body. The abutment surface serves to urge a corrugation of a duct against the annular seal when each of the arms moves from the first position to the second position.

DETAILED DESCRIPTION OF THE PRESENT INVENTION

Figure 1:
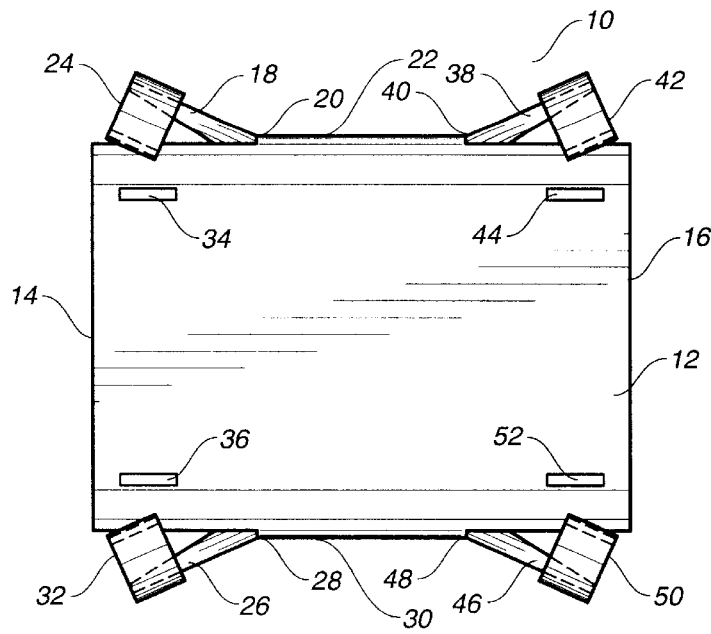
FIG. 1 is a side elevational view of the coupler apparatus in accordance with the preferred embodiment of the present invention.

Referring to FIG. 1, there is shown at 10 the duct coupler apparatus in accordance with the teachings of the present invention. The duct coupler apparatus 10 includes a tubular body 12 suitable for the receipt of the ends of a duct therein. Tubular body 12 includes a first open end 14 and a second open end 16. The interior of the tubular body 12 will have a size greater than the size of the duct to be received therein. In general, the interior diameter of the tubular body 12 will correspond to the maximum diameter of the ducts to be received therein. The shape of the tubular body 12 will also conform to the shape of the ducts to be received therein.

As can be seen in FIG. 1, compression means are formed around the tubular body 12. The compression means includes an arm 18 which is hingedly connected at 20 to the exterior surface 22 of the tubular body 12. As will be described hereinafter, the arm 18 will include an abutment surface at the area of the hinged connection 20. A latching mechanism 24 is connected to an opposite end of the arm 18 from the hinged connection 20. The latching mechanism 24 serves to fixedly attach the opposite end of the arm 18 to the tubular body 12.

In the present invention, a second arm 26 is hingedly connected at 28 to an opposite side 30 of the tubular body 12. Another latching mechanism 32 is connected to the end of the arm 26. The arms 18 and 26 are connected generally adjacent to the first open end 14 of the tubular body 12.

A first slot 34 is formed in the tubular body 12 adjacent to the first open end 14. Slot 34 serves to receive the latching mechanism 24 therein such that the arm 18 will be secured against the exterior surface 22 of the tubular body 12. A second slot 36 is formed adjacent to the first open end 14. The second slot 36 will receive the second latching mechanism 32 when it is desired to secure the arm 26 in a position adjacent to the exterior surface of the tubular body 12.

A third arm 38 is hingedly connected at 40 to the tubular body 12. A latching mechanism 42 is formed at an end of the arm 38 opposite the hinged connection 40. A third slot 44 is formed on the tubular body 12 adjacent to the second open end 16. The third slot 44 will receive the latching mechanism 42 when it is desired to move the arm 38 from the position shown in FIG. 1 to a closed position in which the arm 38 is adjacent to the exterior surface 22. A fourth arm 46 is hingedly connected at 48 to the tubular body 12 on side 30. A latching mechanism 50 is connected to the arm 46 opposite the hinged connection 48. A fourth slot 52 is formed in the tubular body 12 adjacent to the second open end 16. The fourth slot 52 will receive the latching mechanism 50 when it is desired to move the arm 46 to its closed position.

Each of the arms 18, 26, 38 and 46 are movable from a first position (as shown in FIG. 1) to a second position in which each of the latching mechanisms 24, 32, 42 and 50 are received by their respective slots 34, 36, 44 and 52. When the latching mechanisms are suitably received by their respective slots, the ducts interior of the tubular body 12 will be properly juxtaposed against an annular so as to prevent liquid intrusion from affecting the interior of the ducts.

Figure 2:
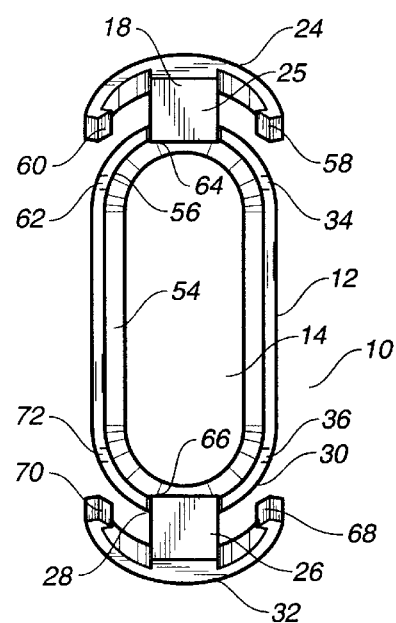
FIG. 2 is an end view of the coupler apparatus of the present invention.

FIG. 2 shows the first open end 14 of the tubular body 12 of the duct coupler apparatus 10 of the present invention. As can be seen, the tubular body 12 has a generally oval configuration. Importantly, an annular sealing member 54 is affixed against a surface of a shoulder 56 formed on the interior of the tubular body 12. Surface 56 and the sealing member 54 serve to create a liquid-tight seal between the exterior surface of a duct and the interior of the tubular body 12. The sealing member 54 is an elastomeric seal having a configuration which generally matches the configuration of a surface of a corrugation of a duct received within the first open end 14.

In FIG. 1, it can be seen that the first arm 18 is hingedly connected at 20 to the tubular body 12. The latching mechanism 24 is a generally U-shaped member which is affixed to an opposite end of the arm 18. A first prong 58 is formed at one end of the U-shaped member of the latching mechanism 24. A second prong 60 is formed at an opposite end of the U-shaped member of the latching mechanism 24. As can be seen, the first prong 58 will be received in snap-fit engagement with the slot 34. The prong 60 will be received in snap-fit engagement with the slot 62 on the opposite of the tubular body 12 from the first slot 34. The arm 20 includes an abutment surface 64 which will serve to push a surface of a corrugation of the duct in compressive contact with the seal 54.

In FIG. 2, it can be seen that the second arm 26 is hingedly connected at 28 to the bottom side 30 of the tubular body 12. An abutment surface 66 is formed at the end of the arm 26 just below the hinged connection 28 and opposite to the latching mechanism 32. The latching mechanism 32 includes a first prong 68 formed at one end of the U-shaped configuration of the latching mechanism 32. A second prong 70 is formed at an opposite end of the U-shaped configuration of the latching mechanism 32. The first prong 68 can be received within the slot 36 when the arm 26 is moved to its closed position. Similarly, the second prong 70 can be received within a slot 72 when the arm 26 is moved to its closed position. When the arm 26 is moved to its closed position, the abutment surface 66 will serve to urge a corrugation of the duct into compressive contact with a surface of the sealing member 54.

Figure 3:
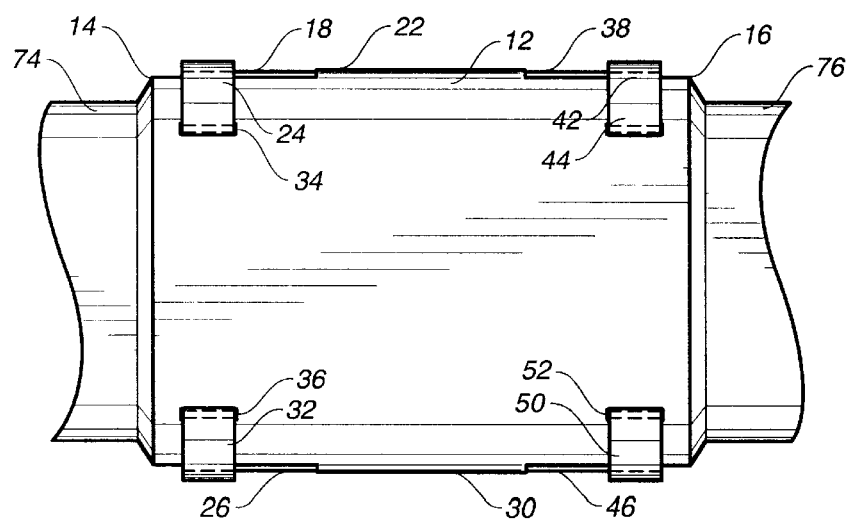
FIG. 3 is a side elevational view of the coupler apparatus of the present invention shown in its closed duct-retaining position.

FIG. 3 shows how first duct 74 and second duct 76 are received within the open ends 14 and 16, respectively, of tubular body 12. As can be seen in FIG. 3, the first arm 18 has been moved to its closed position such that the arm 18 is aligned with the exterior surface 22 of the tubular body 12. The latching mechanism 24 is received within the slot 34. The second arm 26 is moved to its closed position so as to be aligned with the exterior surface 30 of the tubular body 12. The latching mechanism 32 is received within slot 36. The third arm 38 is moved to its closed position in alignment with exterior surface 22 of the tubular body 12. The latching mechanism 42 is received within the slot 44 of tubular body 12. Finally, the fourth arm 46 is shown in its closed position aligned with the exterior surface 30 of the tubular body 12. The latching mechanism 50 is shown as received within the slot 52. In this configuration, the ducts 74 and 76 will be locked into their respective positions. Also, in this position, the corrugations of each of the ducts 74 and 76 will be in compressive contact with the respective seals 54 on the interior of the tubular body.

Figure 4:
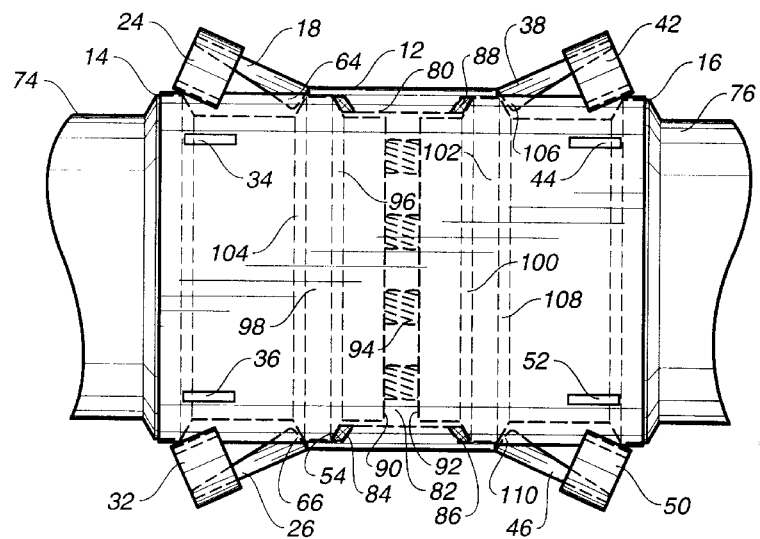
FIG. 4 is a diagrammatic illustration of the duct coupler apparatus in its receiving condition.

FIG. 4 is a diagrammatic illustration of the coupler apparatus 10 as used for the receipt of the ducts 74 and 76 therein. As can be seen in FIG. 4, the tubular body 12 has shoulder 80 formed therein. Shoulder 80 is of an annular configuration extending inwardly into the interior passage 82 of the tubular body 12. The shoulder 82 includes a first surface 84 which faces the first open end 14 of tubular body 12. Another surface 86 is formed on shoulder 80 so as to face the second open end 16 of tubular body 12. The first annular seal 54 is juxtaposed against the surface 84 of shoulder 80. A second elastomeric seal 88 is juxtaposed against the surface 86 of shoulder 80. The shoulder 80 extends into the interior passage 82 of tubular body 12 for a distance less than the diameter of the end 90 of the first duct 74 and the end 92 of the second duct 76. It can be seen in FIG. 4 that the ducts 74 and 76 have tendons 94 extending therethrough.

Initially, during installation, the tubular body 12 can be placed over the end 92 of the second duct 76. The end 90 of the first duct 74 can then be placed into the open end 14 of the tubular body 12. The ducts 74 and 76 are pushed toward one another such that a surface 96 of a corrugation 98 of the first duct 74 will reside in close proximity to the seal 54 and a surface 100 of a corrugation 102 of the second duct 76 is placed in close proximity to the seal 88. When the ducts 74 and 76 are located in this position, the abutment surface 64 of the arm 18 will be in close proximity to a surface 104 of the corrugation 94. Similarly, the abutment surface 66 of the second arm 26 will reside in close proximity to the surface 104 of corrugation 98. Then the arms 18 and 26 are pushed downwardly toward the exterior surface of the tubular body 12, the respective abutment surfaces 64 and 68 will serve to push the corrugation 98 toward the elastomeric seal 54. Ultimately, when the arms 18 and 26 are suitably pushed downwardly, the respective latching mechanisms 24 and 32 will engage slots 34 and 36, respectively.

Similar action takes place with respect to the sealing of the duct 76 within the interior passageway 82 of the tubular body 12. Initially, the abutment surface 106 of the third arm 38 will push on the surface 108 of corrugation 102. The abutment surface 110 of the fourth arm 46 will push against the surface 108 of the corrugation 102. Ultimately, this will serve to push the surface 100 into compressive water-tight contact with the seal 88. Ultimately, the latching mechanism 42 will be received within slot 44 and the latching mechanism 50 will be received within slot 52.

Figure 5:
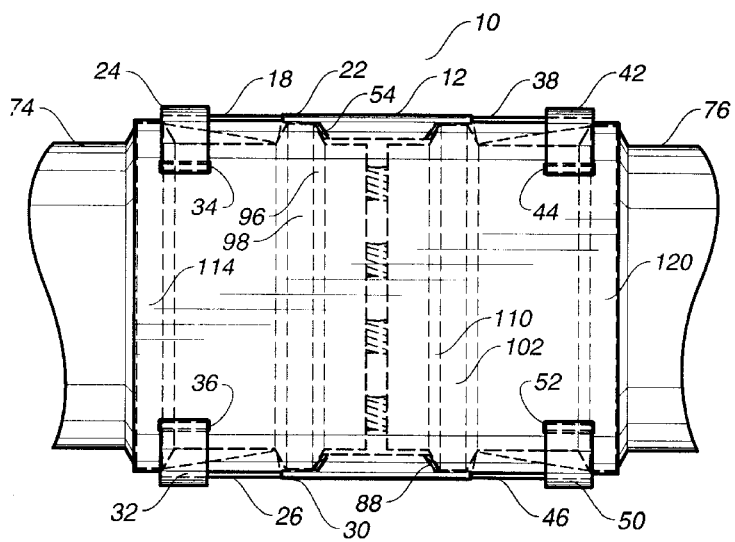
FIG. 5 is a diagrammatic illustration of the duct coupler apparatus of the present invention shown in its duct-retaining position.

FIG. 2 shows the configuration of the coupler apparatus 10 of the present invention in its closed position. As can be seen in FIG. 5, the surface 96 of the corrugation 98 is in compressive contact with the seal 54. The latching mechanism 24 has been received within the slot 34. The slot 34 is shown as located between the corrugation 98 and the corrugation 114 of the first duct 74. The latching mechanism 32 is shown as received within the slot 36. The arm 18 is aligned with the exterior surface 22 of the tubular body 12. The arm 26 is shown as aligned with the exterior surface 30 of tubular body 12.

The surface 110 of the corrugation 102 is illustrated as being in compressive contact with the seal 88. In this position, the latching mechanism 42 is locked within the slot 44. The latching mechanism 50 is shown as locked within the slot 52. The respective arms 38 and 46 are shown as aligned with the exterior surfaces 22 and 30 of the tubular body 12. The slots 44 and 52 are illustrated as located between the corrugation 102 and the corrugation 120 of the second duct 76.

Figure 6:
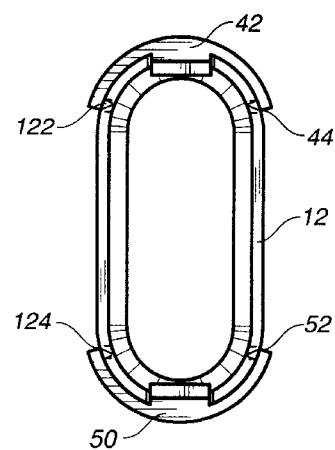
FIG. 6 is a diagrammatic illustration of the duct coupler apparatus in its closed position as shown retaining a duct therein.

FIG. 6 shows the latching mechanism 42 with its respective prongs located within slot 44 and a slot 122 on the opposite side of the tubular body 12 from slot 44. Similarly, latching mechanism 50 has its prong positioned within slot 52 and an opposite prong located within slot 124 on an opposite side of the tubular body 12.

In the present invention, each of the components of the coupler apparatus 10 can be integrally formed of polymeric material. Since the entire coupler apparatus is formed of a unitary piece of polymeric material, assembly of separate components the coupler apparatus is not required at the job site. This avoids the accidental loss of such components. The coupler apparatus is in suitable condition for connecting ducts, as illustrated. The unique latching mechanism of the present invention assures that a positive liquid-tight seal is created between the exterior of the duct and the interior of the coupler apparatus. As such, liquid intrusion into the steel strands 94 is effectively prevented. A complete and integral seal is maintained around the interior of the tubular body 12. As such, there are no seams through which liquid can intrude. Assembly of the present invention can be carried out in a simple and non-complicated manner.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

I claim:

1. A duct coupler apparatus comprising:
    a tubular body having an interior passageway, said tubular body having a first open end and a second open end, said tubular body having a shoulder formed interior thereof between said first and second open ends;
    a sealing means connected to said shoulder, said sealing means performing a liquid-tight seal with a duct received within one of said first and second open ends; and
    a compression means hingedly connected to said tubular body, said compression means for urging the duct into compressive contact with said sealing means, said compression means having a portion extending exterior of said tubular body; said compression means comprising:
    an arm having an end hingedly connected to said tubular body, said arm having an abutment surface adjacent said end; and
    a latching means connected to an opposite end of said arm, said latching means for fixedly attaching said opposite end of said arm to said tubular body.

2. The apparatus of claim 1, said shoulder having one side facing said first end and another side facing said second end, said sealing means comprising:
    a first annular seal affixed to said one side and extending around said interior passageway; and
    a second annular seal affixed to said another side and extending around said interior passageway.

3. The apparatus of claim 2, said one side being angled so as to taper away from said first open end as said one side extends into said interior passageway, said another side being angled so as to taper away from said second open end as said another side extends into said interior passageway.

4. The apparatus of claim 1, said body having a first slot formed therein adjacent said first open end, said latching means engageable with said first slot.

5. The apparatus of claim 4, said body having a second slot formed therein adjacent said first open end on an opposite side of said tubular body, said latching means engageable with said second slot.

6. The apparatus of claim 5, said arm being movable between a first position extending outwardly of an exterior of said tubular body and a second position aligned with said exterior of said tubular body, said latching means engaging said first and second slots in said second position.

7. The apparatus of claim 1, said latching means comprising:
    a generally U-shaped member affixed to said opposite end of said arm;
    a first prong formed at an end of said U-shaped member; and
    a second prong formed at an opposite end of said U-shaped member.

8. The apparatus of claim 1, said tubular body, said arm and said latching means being integrally formed together of a polymeric material.

9. A duct coupler apparatus comprising:
    a tubular body having an interior passageway said tubular body having a first open end and a second open end, said tubular body having a shoulder formed interior thereofbetween said first and second open ends;
    a sealing means connected to said shoulder, said sealing means performing a liquid-tight seal with a duct received within one of said first and second open ends; and
    a compression means hingedly connected to said tubular body, said compression means for urging the duct into compressive contact with said sealing means, said compression means having a portion extending exterior of said tubular body, said compression means comprising:

a first arm hingedly connected to one side of said tubular body adjacent said first open end;

a second arm hingedly connected to an opposite side of said tubular body adjacent said first open end;

a third arm hingedly connected to one side of said tubular body adjacent said second open end; and a fourth arm hingedly connected to an opposite side of said tubular body adjacent said second open end, each of said arms being movable between a first position extending outwardly from said tubular body, and a second position aligned with an exterior surface of said tubular body, each of the arms having an abutment means formed adjacent the hinged connection with said tubular body, said abutment means for urging a corrugation of a duct against said sealing means when each of the arms moves from the first position to the second position, said tubular body having a retaining means formed thereon, said retaining means retaining each of the arms in said second position.

10. A multi-strand post-tensioning system comprising:

a first tendon-receiving duct having a plurality of corrugations formed thereon, each of said plurality of corrugations being spaced from an adjacent corrugation;

a second tendon-receiving duct having a plurality of corrugations formed thereon, each of said plurality of corrugations of said second duct being spaced from an adjacent corrugation;

a coupler extending over an end of said first duct and over an end of said second duct, said coupler being a tubular body having a shoulder formed interior thereof, said coupler having a first seal interposed between a corrugation of said first duct and a surface of said shoulder, said coupler having a second seal interposed between a corrugation of said second duct and another surface of said shoulder; and a compression means hingedly connected to said coupler, said compression means for pushing said first duct into compressive contact with said first seal and for pushing said second duct into compressive contact with said second seal, said coupler being a tubular body having an interior passageway with a size greater than said first and second ducts, said shoulder extending into said interior passageway from said tubular body, said first seal being affixed to said surface of said shoulder so as to extend around said first duct against said corrugation of said first duct, said second seal being affixed to another surface of said shoulder so as to extend around said second duct adjacent said corrugation of said second duct, said compression means comprising:

an arm having an end hingedly connected to said tubular body, said arm having an abutment surface adjacent said end; and a latching means connected to an opposite end of said arm, said latching means for fixedly attaching said opposite end of said arm to said tubular body.

11. The system of claim 10, said body having a first slot formed adjacent an open end of said tubular body, said latching means engageable with said first slot, said arm movable between a first position extending outwardly of an exterior of said tubular body and a second position aligned with an exterior of said tubular body, said first slot being positioned in a space between adjacent corrugations of said first duct.

12. The system of claim 10, said latching means comprising:

a generally U-shaped member affixed to said opposite end of said arm;

a first prong formed at an end of said U-shaped member; and a second prong formed at an opposite end of said U-shaped member.

\* \* \* \* \*